(12) United States Patent
Boire et al.

(10) Patent No.: US 6,746,775 B1
(45) Date of Patent: Jun. 8, 2004

(54) GLAZING WITH OPTICAL AND/OR ENERGETIC PROPERTIES CAPABLE OF BEING ELECTRICALLY CONTROLLED

(75) Inventors: Philippe Boire, Paris (FR); Renaud Fix, Paris (FR); Jean-Christophe Giron, Paris (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/486,719

(22) PCT Filed: Jul. 8, 1999

(86) PCT No.: PCT/FR99/01652

§ 371 (c)(1),
(2), (4) Date: Aug. 2, 2000

(87) PCT Pub. No.: WO00/03290

PCT Pub. Date: Jan. 20, 2000

(30) Foreign Application Priority Data

Jul. 9, 1998 (FR) .............................. 98 08808

(51) Int. Cl.$^7$ ................................................ B32B 17/06
(52) U.S. Cl. ................ 428/432; 428/423.1; 428/425.5; 428/425.6; 428/426; 428/428; 428/446; 428/448; 428/697; 428/699; 428/701; 428/702; 269/238; 269/240; 269/245; 269/265; 269/267; 269/273
(58) Field of Search .................... 428/426, 432, 428/433, 469, 472, 423.1, 425.5, 241.6, 428, 446, 448, 697, 699, 701, 702; 359/269, 270, 273, 274; 269/238, 240, 245, 265, 267

(56) References Cited

U.S. PATENT DOCUMENTS

| | | | | |
|---|---|---|---|---|
| 5,578,404 A | * | 11/1996 | Kliem | .......................... 430/7 |
| 5,777,779 A | * | 7/1998 | Hashimoto et al. | ......... 359/270 |
| 5,780,160 A | * | 7/1998 | Allemand et al. | .......... 359/265 |
| 5,800,918 A | * | 9/1998 | Chartier et al. | ............. 428/336 |
| 5,805,330 A | * | 9/1998 | Byker et al. | ................ 359/265 |
| 5,871,843 A | * | 2/1999 | Yoneda et al. | .............. 427/165 |
| 5,935,702 A | | 8/1999 | Macquart et al. | |
| 5,968,538 A | | 10/1999 | Snyder, Jr. | |
| 6,040,939 A | * | 3/2000 | Demiryont et al. | ......... 359/360 |
| 6,042,934 A | | 3/2000 | Guiselin et al. | |
| 6,362,121 B1 | * | 3/2002 | Chopin et al. | ......... 106/287.16 |
| 6,366,013 B1 | * | 4/2002 | Leenders et al. | ........... 313/478 |
| 6,379,788 B2 | * | 4/2002 | Choi et al. | .................. 427/164 |

FOREIGN PATENT DOCUMENTS

| EP | 692463 | * | 1/1996 |
|---|---|---|---|
| JP | 08083581 | * | 3/1996 |

OTHER PUBLICATIONS

Thierry Chopin, Mar. 20, 1997, International Publication No. WO 97/10185, Abstract.*

* cited by examiner

Primary Examiner—Terrel Morris
Assistant Examiner—Andrew T Piziali
(74) Attorney, Agent, or Firm—Oblon, Spivak, McClelland, Maier & Neustadt, P.C.

(57) ABSTRACT

The subject of the invention is glazing which incorporates at least one electrically controllable system having variable optical and/or energy properties, especially in the form of a system comprising one or more reversible-insertion materials of the electrochromic-system type, in the form of an optical-valve or viologen-based system or in the form of a liquid-crystal or cholesteric-gel system. This glazing also includes at least one means for adjusting the optical appearance conferred on the said glazing by the said system, these means comprising at least one coating having antireflection properties in the visible.

21 Claims, 1 Drawing Sheet

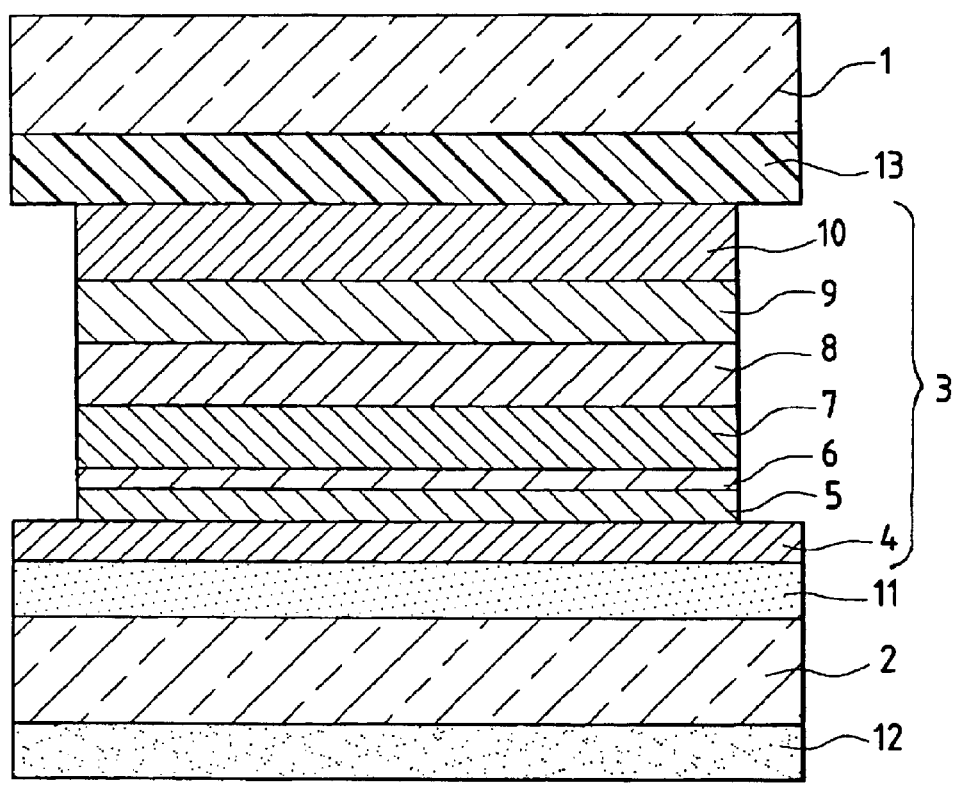

GLAZING WITH OPTICAL AND/OR ENERGETIC PROPERTIES CAPABLE OF BEING ELECTRICALLY CONTROLLED

The present invention relates to glazing having electrically controllable optical and/or energy properties.

Thus, it relates to glazing some of whose characteristics can be modified by a suitable electrical supply, most particularly the transmission, absorption and reflection within certain wavelengths of electromagnetic radiation, especially in the visible and/or in the infrared, or else the light scattering.

There is in fact an increasing demand for so-called "smart" glazing whose properties may be varied.

Thus, from the thermal standpoint, glazing whose transmission/absorption may be varied within at least part of the solar spectrum allows the solar heat influx into rooms or passenger areas/compartments to be controlled when linen it is fitted as the external glazing in buildings or as windows in transportation means of the type comprising cars, trains, aeroplanes, etc., and thus it allows excessive heating of the latter to be prevented should there be strong sunlight.

From the optical standpoint, the glazing allows the degree of vision to be controlled, thereby making it possible to prevent glare should there be strong sunlight, when it is mounted as exterior glazing. It may also have a particularly advantageous shutter effect, both as exterior glazing and if it is used as interior glazing, for example for equipping internal partitions between rooms (offices in a building), or for isolating compartments in trains or aeroplanes, for example.

There are many other applications: for example, glazing having variable light transmission/reflect on may be used for making rear-view mirrors, which can darken as required in order to prevent the driver of the car becoming dazzled. They may also be used for indicating panels on roadways, or any display panel, for example so as to reveal the drawing/message only intermittently in order to attract greater attention.

One particularly advantageous application of the systems having variable light absorption relates to display screens, especially all those with which televisions and computing hardware are equipped. This is because this type of glazing makes it possible to improve the contrast of the image, especially taking the ambient brightness into account.

The advantage that such glazing may provide justifies the fact that many systems have already been studied.

Thus, known systems allowing the light transmission or absorption of glazing to be varied are especially so-called viologen-based systems, such as those described in U.S. Pat. No. 5,239,406 or in Patent EP-A-0,612,826. These make it possible to obtain variable absorption, essentially in the visible region.

To the same end, there are also so-called electrochromic systems, the operating principle of which will be briefly recalled: these comprise, in a known manner, a layer of an electrochromic material capable of reversibly and simultaneously inserting ions and electrons, the oxidation states of which electrochromic material corresponding to the inserted and extracted states have a distinct colour, one of the states having a higher light transmission than the other. The insertion or extraction reaction is controlled by a suitable electrical supply using a current generator or a voltage generator. The electrochromic material, usually based on tungsten oxide, must thus be brought into contact with a source of electrons, such as a transparent electrically conductive layer, and with a source of ions (cations) such as an ionically conductive electrolyte.

Moreover, it is known that, in order to guarantee at least the order of a hundred switching operations, the layer of electrochromic material must be connected to a counterelectrode which is itself capable of reversibly inserting cations, symmetrically with respect to the layer of electrochromic material, so that, macroscopically, the electrolyte appears as a single ion medium.

The counterelectrode must consist of a layer which is either neutral in terms of colour or is at least transparent or barely coloured when the electrochromic layer is in the bleached state. Since tungsten oxide is a cathodic electrochromic material, that is to say its coloured state corresponds to the most reduced state, an anodic electrochromic material based on nickel oxide or iridium oxide is generally used for the counterelectrode. It has also been proposed to use an optically neutral material in the oxidation states in question, such as, for example, cerium oxide or organic materials such as electronically conductive polymers (polyaniline, etc.) or Prussian blue.

A description of such systems will be found, for example, in European Patents EP-0,338,876, EP-0,408,427, EP-0,575, 207 and EP-0,628,849.

At the present time, these systems may be put into two categories, depending on the type of electrolyte that they use:

either the electrolyte is in the form of a polymer or a gel, for example a polymer which conducts via protons, such as those described in European Patents EP-0,253, 713 and EP-0,670,346, or a polymer which conducts via lithium ions, such as those described in Patents EP-0,382,623, EP-0,518,754 or EP-0,532,408;

or the electrolyte is an inorganic layer which is ionically conductive but electronically insulating—these are then referred to as "all-solid" electrochromic systems. For the description of an "all-solid" electrochromic system, reference may be made to European Patent Applications EP-97/400702.3 (filed on March 27, 1997) and EP-0,831,360.

Other systems use electrochromic-type reversible ion-insertion materials slightly differently. These are, for example, so-called gasochromic systems, in which the electrochromic material is provided with a thin catalytic layer capable of decomposing hydrogen and mounted in a double-glazing unit on the internal gas-cavity side: by sending hydrogen into the internal space of the double-glazing unit, tungsten oxide becomes coloured. It returns to the bleached state by injecting oxygen, instead of hydrogen, into the internal space.

These systems having one or more reversible-insertion materials are particularly advantageous in the sense that they allow the absorption to be varied over a broader wavelength range than viologen-based systems: they allow variable absorption not only in the visible but also, in particular, in the infrared, which may confer on them an effective optical and/or thermal role.

Viologen-based or electrochromic systems, deposited on or associated with transparent substrates, firm glazing whose light absorption and transmission as well as energy transmission) may vary within given ranges, especially ranges determined by the choice of electrochromic materials used and/or by the choice of their thicknesses.

Another type of "smart" glazing is formed by what is termed an "optical valve": this is a film comprising a generally crosslinked polymer matrix in which microdroplets are dispersed, these microdroplets containing particles which have the property of being aligned in a preferred direction due to the action of an electric or magnetic field.

The film has variable optical properties depending in particular on the potential applied to he terminals of the conductive layers placed on either side of the film and on the concentration and nature of the orientable particles. Thus, Patent WO-93/09460 discloses an optical valve based on a film comprising a crosslinkable poly-organosilane matrix and inorganic or organic orientable particles, more particularly light-absorbing particles such as particles of polyiodides. When a voltage is applied to the film, the particles intercept the light much less than when no voltage is applied.

Glazing with variable light scattering, the operating principle of which is similar, is also known by the expression "liquid-crystal glazing". This is based on the use of a film placed between two conductive layers based on a polymeric material in which droplets of liquid crystals are dispersed, especially nematic liquid crystals of positive dielectric anisotropy. When a voltage is applied to the film, the liquid crystals orient in a preferred direction, thereby allowing vision. When no voltage is applied, and the crystals are not aligned, the film becomes scattering and prevents vision. Examples of such films are described, for instance, in European Patent EP-0,238,164 and U.S. Pat. Nos. 4,435,047, 4,806,922 and 4,732,456. This type of film, once laminated and incorporated between two glass substrates, is sold by Saint-Gobain Vitrage under the brand name "Privalite". In fact, it is possible to use any of the liquid-crystal devices known by the term "NCAP" (Nematic Curvilinearly Aligned Phase) or the term "PDLC" (Polymer Dispersed Liquid Crystal) or the term "CLC" (Cholesteric Liquid Crystal). These may furthermore contain dichroic dyes, especially in solution in the liquid-crystal droplets. It is then possible to jointly vary the light scattering and the light absorption of the systems.

It is also possible to use, for example, gels based on cholesteric liquid crystals containing a small amount of crosslinked polymer, such as those described in Patent WO-92/19695.

However, all these various systems/glazing assemblies have limits which are intrinsic to them, which limits relate especially to their optical appearance.

Thus, in the case of electrochromic-type glazing, it is possible to vary the range of accessible values of, light transmission ($T_L$) by adjusting, for example, the thickness of the layer (or layers) based on a reversible-insertion material. However, for a given system, the $T_L$ range can only be shifted somewhat towards lower or higher values, and this cannot be easily extended. Furthermore, the choice of reversible-insertion material will have a bearing on the colorimetric appearance of the glazing both in transmission and in reflection.

The object of the invention is therefore to alleviate these drawbacks, especially by proposing novel electrically controllable glazing having variable optical and/or energy properties, the optical appearance of which can also be varied.

The subject of the invention is a glazing which incorporates at least one electrically controllable system having variable optical and/or energy properties, of the type comprising a system having variable light and/or energy transmission/absorption and/or variable light scattering. This glazing furthermore includes at least one means for adjusting the optical appearance conferred on the glazing by the electrically controllable system. This means is advantageously in the form of at least one coating having antireflection properties in the visible or in the near infrared.

In order to simplify matters, hereafter this coating will be referred to as an "antireflection coating" and the electrically controllable system will be referred to as the "functional system".

Combining the functional system with an antireflection coating, the characteristics of which may be adjusted precisely, makes it actually possible to modify the optical or thermal performance of the glazing. Thus, the antireflection coating may have an influence on the range of light or solar transmission that the glazing may have with an ad hoc electrical supply: in particular, it may shift, in a controlled manner, this range towards higher $T_L$ or $T_E$ (energy transmission) values. Specifically, this means that, for a given functional system, the addition of the antireflection coating will make it possible to modify its $T_L$ or $T_E$ range depending on the intended application, without having to modify the functional system itself. With regard to the manufacture of the glazing, this allows production which is much more flexible and rational than if as many different functional systems as there are envisaged applications had to be manufactured.

This is because, for some applications, the aim is to provide a strongly colouring/absorbing effect when a voltage is applied, making accommodations for a certain residual coloration when no voltage is applied (for example if it is desired to tend towards glazing having a shutter effect in the coloured state).

On the other hand, for other applications, it will be necessary for the glazing to have, when no voltage is applied, little or even no residual coloration. This may be the case, for example, in functional systems for display screens. Furthermore, it is much simpler to maintain only as restricted a number of "standard" functional systems as possible and to adapt them by means of the ad hoc antireflection coating, which coating is generally much less complicated to manufacture than the functional systems.

The antireflection coating may also allow the range of accessible $T_L$ or $T_E$ values to be extended. This is a very important advantage whatever the application intended, which advantage is particularly essential when the glazing is used to enhance the contrast of display screens. This is most particularly true with new televisions making use of flat-screen, plasma technology, these also being called emissive, which tend to have a much lower brightness than standard cathode-ray-tube televisions.

One advantageous embodiment of the antireflection coating consists in depositing it on at least one of the external faces of the glazing, that is to say the faces exposed directly to the ambient atmosphere of the glazing. Both these faces may be treated or, in the case of display-screen glazing, only the face turned towards the outside of the apparatus. In a known manner, this coating may comprise a stack of thin layers having alternately high and low refractive indices, which, by an interference effect, tend to reduce the light reflection of the glazing to the profit of an increase in its light transmission. Examples of antireflection stacks are, for example, known from Patents EP-0,728,712, EP-0,712,815 and EP-0,791,562.

These layers are generally made of a dielectric material of the oxide type ($SiO_2$ or $Al_2O_3$ for the layers having a low index of less than 1.7 and $SnO_2$, $TiO_2$ or $Nb_2O_5$ for the layers having a higher index of at least 1.9) or else of the fluoride type ($MgF_2$ as the low-index layer) or of the nitride type, such as $Si_3N_4$ or silicon derivatives of the $SiO_xN_z$ or $SiO_xC_y$ type.

However, an antistatic function may also be conferred on the antireflection coating by incorporating into the coating, as a low-index or high-index layer, a layer of a material which, from an electrical standpoint, is at least slightly conductive. A layer or a doped metal oxide may especially be chosen, such as $F:SnO_2$ or ITO (tin-doped indium oxide), which has an index of at least 1.9 to 2.0 or a layer of a conductive polymer.

The antireflection coating may also consist only of a single layer having a refractive index gradient in its thickness, this layer being obtained, for example, using a pyrolysis-type deposition technique. This hot deposition technique makes it possible to obtain layers which are particularly durable from a mechanical standpoint, which may be very important depending on the envisaged application of the system, especially so that the coating can withstand being touched, being repeatedly cleaned, etc. This graded-index layer has in fact a chemical composition which varies through its thickness, for example gradually approaching a $SiO_2$-type composition from one of the SiOC or SiON type.

The glazing according to the invention may also include a means for adjusting the optical appearance conferred on the said glazing by the functional system, comprising at least one coating for attenuating/modifying the colour of the glazing in reflection (this coating being as an addition or an alternative to the previous antireflection coating). This is because, in some applications, for example in the case of glazing for display screens of all kinds, it is preferable for the colour of the glazing in reflection to be as neutral as possible, especially so that in the completely bleached state the glazing does not appear tinted at all and so that it is of a tint modifying the colour of the image appearing on the screen as little as possible. Since the antireflection coating makes it possible for the intensity of light reflection of the glazing to be generally lowered, this other coating may therefore complete its optical role by allowing its colour in reflection to be attenuated, in practice by lowering the C* saturation values, in the (L,a*,b*) colorimetry system, of the glazing in reflection.

This coating is advantageously in contact with the functional system, in the form of a thin layer at least having a refractive index intermediate between those of the materials with which it is in contact on each of its faces. This may especially be a thin layer having a refractive index of between 1.6 and 1.9, especially one based on aluminium oxide $Al_2O_3$, on aluminum oxynitride AlN or on yttrium oxide $Y_2O_3$, on silicon oxycarbide and/or oxynitride SiOC, SiON, or on a mixture of at least two of these materials, which may be deposited by vacuum technologies of the sputtering type or by pyrolysis-type technologies, the latter being most particularly indicated for depositing layers of silicon derivatives.

This coating may comprise not one layer, but several, especially in the form of at least two superposed layers whose average index is, for example, between 1.6 and 1.9, for example an $SnO_2/SiO_2$ or $SnO_2/SiO_2/SnO_2$ stack.

This coating may also be a layer having an index gradient through its thickness so as to optimize its adjustment with respect to the indices of the materials which surround it. The formation of such a graded-index layer using a vapour-phase pyrolysis technique (also called CVD for "Chemical Vapour Deposition") is, for example, described in Patent WO-97/03029 (to which reference may also be made for the graded-index layer of the previous antireflection coating).

The glazing according to the invention may also include a primer/tie-layer coating for the functional system with respect to its carrier substrate, which may prove to be particularly advantageous if the nature of the substrate is polymeric/plastic and not mineral, of the glass type. The coating may comprise a thin metal layer, a layer of a silicon derivative of the $SiO_2$ type or of a suitable metal oxide of the $Al_2O_3$ type. It may also be a tie-layer varnish.

Advantageously, this tie-layer coating may also be made to fulfil a role of attenuating the colour of the glazing in reflection, like the specific coating mentioned above, especially if it has a refractive index matching that of the plastic substrate and that of the layer of the functional system with which it is in contact.

The glazing according to the invention may also include a hydrophilic coating having antimisting properties or a hydrophobic coating having anti-rain properties on at least one of its external faces. As suitable hydrophobic coating, reference may be made, for example, to Patents EP-799,873 and EP-692,463. It may especially be at least one layer consisting of a composition having at least one fluoroalkoxysilane, the alkoxy functional groups of which are directly linked to the silicon atom, a system of one or more aqueous solvents and at least one catalyst chosen from an acid and/or a Brönsted base. The coating may also include a primer layer promoting adhesion of the hydrophobic layer to the glass, for example a primer layer based on silanes.

The glazing according to the invention may also include a coating having photocatalytic properties giving the glazing antifouling properties, especially on at least one of its external faces. This may especially be a coating comprising semiconductor materials, of the crystallized oxide or sulphide type, having this type of property, especially crystallized oxides of the ZnO, $WO_3$ or $SnO_2$ type and more particularly titanium oxide at least partially crystallized in anatase form. This type of coating and the various ways of obtaining it are especially described in Patents WO-97/10186 and WO-97/10185. These coatings make it possible to degrade any dirt of organic nature. They may furthermore be hydrophilic and thus promote the removal of inorganic dirt as well.

The glazing according to the invention may also include at least one coating having electromagnetic screening properties, especially screening properties with respect to radiation emitted by emissive screens of the plasma-screen type. This type of coating includes, for example, at least one thin layer essentially made of metal, or of a conductive metal oxide, and/or one or more superposed arrays of metal conducting wires and/or a metal mesh.

The functional system of the glazing is, as was seen previously, generally in the form of a superposition of functional layers placed between two carrier/protective substrates which may be rigid, semi-rigid or flexible. It may be advantageous to use, as carrier substrate, at least one of the rigid substrates of which the glazing is composed and/or at least one flexible carrier substrate which may be associated, by lamination, with one of the rigid substrates of which the glazing is composed. The functional system may also be placed on a suitable substrate, and then simply protected/encapsulated by an impermeable protective coating providing it with a degree of mechanical protection. It may be an inorganic layer of the $SiO_2$ or $Si_3N_4$ type. It may also be of the polymer(s) type instead, especially in the form of a varnish (epoxy or polyparaxylylene) or of a lacquer (polyurethane or polyacrylic). Preferably, it may be a vacuum-deposited monolayer of a polymer.

The object of the invention is also the use of the glazing described above as glazing for buildings, especially as exterior windows, windows for interior partitions or glazed doors (for example sunroofs of the "Vélux" type), and as glazing with which transportation means are equipped, especially windows for motor vehicles (sunroofs and front and rear side windows) railway windows or aeroplane windows, especially as windscreens, windscreen top-tint strips, or cabin windows. Such glazing is also indicated for equipping display screens in order to enhance image contrast, especially television or computer screens. Such glazing may also be used as protection for solar panels (satellites), for camera lenses, for spectacles for aircraft pilots, sunglasses or ophthalmic spectacles, or else as glazing suitable for the protection of objects/plants from heat or strong light which are sensitive thereto, for example for equipping greenhouses or shop windows.

As mentioned above, the invention thus applies to various types of electrochemically controllable glazing. This may be, as mentioned, glazing having variable light transmission/absorption, especially having a viologen-based or electrochromic system, particularly of the type of those described in the aforementioned Patents EP-0,338,876, EP-0,408,427, EP-0,575,203 and EP-0,628,849. It is preferably in the form of a stack of functional layers comprising, in succession, a preferably transparent electrically conductive layer, a so-called cathodic electrochromic layer capable of reversibly inserting cations such as $H^+$, $Li^+$, $Na^+$, $Ag^+$, a layer of electrolyte, optionally a counterelectrode in the form of a second, so-called anodic, electrochromic layer which is also capable of reversibly inserting cations, and finally a second electrically conductive layer.

With regard to the nature of the electrically conductive layers of the device, there are two possible variants. It is possible to use materials based on doped metal oxides, such as fluorine-doped tin oxide $F:SnO_2$ or tin-doped indium oxide ITO. It is also possible to use layers of metals or of metal alloys, for example based on gold Au, silver Ag or aluminium Al. Since the device generally possesses two electrically conductive layers, they may both be metal layers, or they may both be based on doped oxides, or one may be based on metals and the other based on doped oxides. It is also possible to superpose several electrically conductive layers of different types, for example a doped-oxide layer associated with at least one metal layer in a stack of the ITO/Ag or Au/ITO type, for example.

These layers (or at least one of them) may also be made of one or more conductive polymers.

In order to form the layer of cathodic electrochromic material, a material, or a mixture of materials, chosen from the group comprising tungsten oxide $WO_3$, molybdenum oxide $MoO_3$, vanadium oxide $V_2O_5$, niobium oxide $Nb_2O_5$, titanium oxide $TiO_2$, a "cermet" material (a combination of metallic and ceramic material, especially in the form of metal particles in a ceramic matrix) such as $WO_3/Au$ or $WO_3/Ag$, and a mixture of tungsten and rhenium oxides $WO_3/ReO_3$, may be chosen. These materials are especially suitable in the case of the reversible insertion of lithium ions. If the device operates by the reversible insertion of protons, the same materials may be used, but this time in hydrated form.

In order to form the layer of anodic electrochromic material, a material which satisfies the formula $M_xA_yU_z$, where M is a transition metal, A is the ion used for the reversible insertion, for example an alkali metal or a proton, and U is a chalcogen, such as oxygen or sulphur, may be chosen.

It may, especially in the case of the insertion of proton ions $H^+$, be a compound or a mixture of compounds belonging to the group comprising $LiNiO_x$, $IrO_xH_y$, $IrO_xH_yN_z$, $NiO_x$, $NiO_xH_yN_z$, $RhO_x$, $CoO_x$, $MnO_x$ and $RuO_x$. In the case of the reversible insertion of lithium ions $Li^+$, a compound or a mixture of compounds belonging to the group comprising $LiNiO_x$, $LiMn_2O_4$, $Li_xS_nO_y$, $IrO_x$, $Li_xIrO_y$, $Li_xS_nO_y$, $NiO_x$, $CeO_x$, $TiO_x$, $CeO_x$—$TiO_x$, $RhO_x$, $CoO_x$, $CrO_x$ and $MnO_x$ is chosen instead.

With regard to the choice of electrolyte material, there are in fact two types of this, as was mentioned above.

It may be a layer of aqueous liquid, such as water to which sulphuric or phosphoric acid has been added, in the case of the reversible insertion of protons and may be a layer of anhydrous liquid, such as propylene carbonate containing a lithium salt, in the case of the reversible insertion of lithium ions. It may also be a layer of gel or of polymer, especially protonically conductive polymers of the type comprising a solid solution of polyoxyethylene and of phosphoric acid POE—$H_3PO_4$.

However, it may also be an electrolyte in the form of a solid material, especially one based on a metal oxide. According to a variant of the invention, the system is chosen so that it contains only layers of solid materials. Within the context of the invention, the term "solid material" should be understood to mean any material having the mechanical integrity of a solid, particularly any essentially inorganic or organic material or any hybrid material, that is to say one that is partially inorganic and partially organic, such as materials that may be obtained by sol-gel deposition from organo-inorganic precursors. The configuration is then one of a so-called "all-solid" system which is an advantage in terms of ease of manufacture. This is because, when the system contains an electrolyte in the form of a polymer which does not have, for example, the mechanical integrity of a solid, this requires in fact the manufacture, in parallel, of two "half-cells" each consisting of a carrier substrate coated with a first electrically conductive layer and then with a second, electrochemically active layer, these two half-cells then being joined together with the electrolyte inserted between them. With an "all-solid" configuration, the manufacture is simplified since all the layers of the system may be deposited, one after the other, on a single carrier substrate. Thus all the operations for manufacturing the glazing are simplified since there is now only a single substrate intended to receive layers instead of two.

Furthermore, whether the electrolyte is a "solid" electrolyte or not, it may comprise a layer made of an ionically conductive material capable of reversibly inserting the ions, but the degree of oxidation of which is maintained essentially constant. It may especially be a material having electrochromic properties, as described in the aforementioned Patent EP-97/400702.3.

The functional system of the element according to the invention may therefore be placed either between two substrates, or on a single substrate, more particularly in the case of an "all-solid" system. The rigid carrier substrates are preferably made of glass, acrylic polymer, polycarbonate or certain polyurethanes. The carrier substrates may also be soft, flexible and intended to be laminated to rigid substrates; it may be a soft polycarbonate, a polyethylene terephthalate (PET), etc. The lamination may be carried out with intercalated sheets of polymer of the thermoplastic type, such as polyvinyl butyral (PVB), ethylene-vinyl acetate (EVA) or certain polyurethanes. With no lamination carried out, the system may also be provided with a protective varnish or film, as mentioned above.

Such glazing may thus have a "monolithic" structure, that is to say comprises a single rigid substrate, or a plurality of rigid substrates, a laminated and/or multiple-glazing structure, or else a so-called asymmetric glazing structure with an external plastic layer, especially based on polyurethane, which structure is especially described in Patents EP-191,666, EP-190,953, EP-241,337, EP-344,045, EP-402,212, EP-430,769 and EP-676,757.

By way of example, the glazing according to the invention may thus have a structure or sequence of the type:

antireflection coating/glass 1/coating attenuating or modifying the colour in reflection/functional system/intercalated sheet of polymer of the PU type/glass 2

This system may also be combined with another glass in order to form a double-glazing unit. It is also possible to provide an intercalated sheet of polymer of the PU type and another glass between the glass 1 and the coating attenuating the colour in reflection: it is thus possible to appose one structure (antireflection coating/glass 1) with another structure (functional system/coating attenuating the colour/glass), these structures being laminated with a sheet of polymer.

Further details and advantageous characteristics of the invention emerge from the description given below of various non-limiting embodiments, with reference to the appended drawing which shows:

FIG. 1: electrochromic glazing having a laminated structure in cross section

This figure is extremely schematic and does not respect the proportions between the various elements shown, so as to make it easier to understand. In particular, all the electrical connections, which are known per se, are not shown.

The rigid substrates used for all the following examples are substrates made of silicon-soda-lime glass 4 mm in thickness (their thickness may in fact be chosen especially within the 0.7 to 6 mm range).

These are so-called "clear" glass substrates sold by Saint-Gobain Vitrage under the name Planilux.

EXAMPLE 1

FIG. 1 shows electrochromic glazing having a laminated structure comprising two glass plates in a configuration suitable, for example, to be used as the display screen of a flat-screen television: it shows two clear glass plates 1 and an electrochromic functional system 3 of the "all-solid" type, consisting of the stack of the following functional layers and a sheet of polyurethane 13:

- a first, electrically conductive layer 4 made of $F:SnO_2$ 500 nm in thickness;
- a first layer 5 of anodic electrochromic material made of iridium oxide $IrO_x$ (hydrated) 30 nm in thickness (it could be replaced with a layer of hydrated nickel oxide);
- a layer 6 of hydrated tantalum oxide $Ta_2O_5.H_x$ 5 nm in thickness, having a tie-layer function;
- a layer 7 of tungsten oxide 200 nm in thickness;
- a second layer 8 of hydrated tantalum oxide 200 nm in thickness;
- a second layer 9 of cathodic electrochromic material based on tungsten oxide $H_xWO_3$ 380 nm in thickness;
- a second layer 10 of ITO 280 nm in thickness.

Between the electrically conductive layer 4 and the glass 2 there is a coating 11 whose function is to attenuate the colour of the glazing in reflection: it is a layer of silicon oxycarbide SiOC having an index of approximately 1.7 and a geometrical thickness of approximately 50 to 55 nm (deposited in a known manner by CVD on the glass 2). Its index is thus intermediate between those of the materials which surround it, namely that of the glass 1 (approximately 1.5) and that of the layer 4 of $F:SnO_2$ (approximately 2).

Deposited on the external face of the glass 2 is an antireflection coating 12 composed of the succession of the following layers (starting from the surface of the glass 2):

$SnO_2$(19 nm)/$SiO_2$(33 nm)/$Nb_2O_5$(115 nm) /$SiO_2$(88 nm)

The coating was deposited in a known manner on the glass 2 by magnetic-field-assisted reactive sputtering in the presence of oxygen using suitable metal/silicon targets.

The coating 12/glass 2/coating 11/functional system 3 assembly is then laminated to the glass 1 by means of sheet 13 of organic polymer of the polyurethane type having a thickness of at least 1.24 mm.

The glazing is mounted so that the glass 2 is the glass facing the outside of the screen.

It appears that by combining the two types of optical coatings 11 and 12 with the functional system 3, it is possible to shift the accessible $T_L$ range to higher values and to reduce the intensity of the residual colour, in reflection, in the bleached state and in the coloured state.

EXAMPLE 2

An example 2 was produced using the same coatings 11 and 12 and the same functional system 3 on the same glass 2. Thereafter, the only difference is the way in which the glass is mounted: in this case, the final ITO layer 10 of the functional system has been simply surmounted by a vacuum-deposited layer of polyparaxylylene varnish. This thus results in a single-glass structure of the type: coating 12/glass 1/coating 11/functional system 3/varnish.

EXAMPLE 3

An Example 3 was produced in a manner similar to Example 1. Only some of the thicknesses of the layers of the electrochromic system differ slightly. Furthermore, the layer 6 of hydrated tantalum oxide was omitted. The stack of the electrochromic system in this Example 3 is therefore as follows:

- a first, electrically conductive layer 4' of $F:SnO_2$ 500 nm thickness;
- a first layer 5' of anodic electrochromic material made of iridium oxide $IrO_x$(hydrated) 37 nm in thickness (it could be replaced with a layer of hydrated nickel oxide);
- a layer 7' of tungsten oxide 100 nm in thickness;
- a second layer 8' of hydrated tantalum oxide 100 nm in thickness;
- a second layer 9' of cathodic electrochromic material based on tungsten oxide $H_xWO_3$ 280 nm in thickness;
- a second layer 10' of ITO 270 nm in thickness.

On the other hand, in the case of the coating 11 and the coating 12 the mounting of the electrochromic system is identical to that in Example 1.

EXAMPLE 4

An example 4 was produced like example 3, apart from the fact that, in this example, there is no antireflection coating 12.

It was confirmed that the optical properties of the glazing were improved when at least one coating (coating 11) attenuating the colour or an antireflection coating (coating 12) was provided, the maximum improvement was obtained by using both types of coating together. It is possible to provide a second antireflection coating (so that each of the external faces of the external substrates 1 and 2 is treated).

The following optical properties of Examples 3 and 4 in the bleached state (+1.2 V supply) and in the coloured state (−1.6 V supply) were compared:

- the light transmission $T_L$ (%);
- the values of $a_{T_L}$ and $b_{T_L}$ in the (L*,a*,b*) system in transmission;
- the light reflection $R_{L1}$ on the "internal side" and the corresponding a* and b* values;

the light reflection $R_{L2}$ on the "external side" and the corresponding a* and b* values.

This data is given in Table 1 below.

Table 2 below gives data on the energy properties of these same two examples, namely the energy transmission $T_E(\%)$, the energy reflection $R_{E1}$ (on the external side) and $R_{E2}$ (on the internal side).

TABLE 1

| EXAMPLE 4 | | | | | | EXAMPLE 3 | | | | | |
|---|---|---|---|---|---|---|---|---|---|---|---|
| $T_L$ | | $R_{L1}$ | | $R_{L2}$ | | $T_L$ | | $R_{L1}$ | | $R_{L2}$ | |
| −1.6 V | +1.2 V | −1.6 V | +1.2 V | −1.6 V | +1.2 V | −1.6 V | +1.2 V | −1.6 V | +1.2 V | −1.6 V | +1.2 V |
| 14.6 | 72.0 | 3.3 | 9.4 | 3.4 | 10.0 | 16.0 | 79.9 | 4.6 | 4.6 | 2.3 | 5.7 |
| a*-2.0 | −3.0 | 1.3 | 6.9 | −0.4 | 3.6 | −2.8 | −3.3 | 0.1 | 14.1 | −2.1 | 8.5 |
| b*-23.6 | 5.7 | 1.0 | −3.8 | 4.6 | −1.7 | −23.2 | 6.4 | −7.7 | −12.2 | 6.3 | −5.3 |

TABLE 2

| EXAMPLE 4 | | | | | | EXAMPLE 3 | | | | | |
|---|---|---|---|---|---|---|---|---|---|---|---|
| $T_E$ | | $R_{E1}$ | | $R_{E2}$ | | $T_E$ | | $R_{E1}$ | | $R_{E2}$ | |
| −1.6 V | +1.2 V | −1.6 V | +1.2 V | −1.6 V | +1.2 V | −1.6 V | +1.2 V | −1.6 V | +1.2 V | −1.6 V | +1.2 V |
| 10.0 | 61.2 | 3.1 | 9.5 | 5.4 | 13.2 | 10.2 | 60.2 | 9.6 | 12.8 | 16.0 | 15.2 |

Also measured were their solar factors SF (the solar factor is the ratio between the total energy entering the room through the glazing to the incident solar energy):

for Example 3: the SF is 33% in the coloured state (−1.6 V) and 73% in the bleached state (+1.2 V);

for Example 4: the SF is 32% in the coloured state and 67% in the bleached state.

It may be seen from this data that, in the case of Example 3 according to the invention, it is possible to achieve a wider light transmission range and, in particular, to achieve a $T_L$ of almost 80% in the bleached state. The energy transmission in the bleached state of Example 3 is also lower than that of Example 4 and the energy reflections are higher, whether in the coloured state or in the bleached state. Example 4, which has only the anti-colour coating, already shows an improvement over standard electrochromic glazing, especially with regard to $R_{L1}$ and $R_{L2}$ colorimetry in reflection. But Example 3, in which an antireflection coating has been added, allows the $T_L$ range to be broadened towards higher values and allows the glazing to be made more effective from the standpoint of the filtration of thermal, especially solar, radiation.

What is claimed is:

1. Glazing comprising (a) at least one electrically controllable system having variable optical and/or energy properties, (b) at least one coating for adjusting the optical appearance conferred on the said glazing by the said system, said at least one coating having antireflection properties in the visible, wherein said coating having antireflection properties is deposited on at least one of the external faces of said glazing and comprises a stack of thin layers having alternately high and low reflective indices or a graded-refractive-index layer, and (c) at least one coating for attenuating/modifying the color of the glazing in reflection, wherein said at least one coating of component (c) acts to lower C* saturation values in the (L, a*, b*) colorimetry system of the glazing in reflection, wherein the coating (c) includes a thin layer having a refractive index of between 1.6 and 1.9, and wherein the thin layer having a refractive index of between 1.6 and 1.9 is based on at least one of aluminum oxide $Al_2O_3$, yttrium oxide $Y_2O_3$, silicon oxycarbide SiOC, and silicon oxynitride SiON.

2. Glazing according to claim 1, wherein the coating (b) also has antistatic properties, and includes a stack of thin layers at least one of which is made of an electrically conductive material comprising a doped-metal-oxide or conductive-polymer.

3. Glazing comprising (a) at least one electrically controllable system having variable optical and/or energy properties, (b) at least one coating for adjusting the optical appearance conferred on the said glazing by the said system, said at least one coating having antireflection properties in the visible, wherein said coating having antireflection properties is deposited on at least one of the external faces of said glazing and comprises a stack of thin layers having alternately high and low reflective indices or a graded-refractive-index layer, and (c) at least one coating for attenuating/modifying the color of the glazing in reflection, wherein the coating (c) is in contact with the electrically controllable system (a), in the form of a thin layer having a refractive index intermediate between those of the materials with which it is in contact on each of its faces.

4. Glazing according to claim 1, wherein the coating (c) includes at least two superposed thin layers whose average refractive index is between 1.6 and 1.9.

5. Glazing according to claim 4, wherein the at least two superposed thin layers whose average refractive index is between 1.6 and 1.9 is an $SnO_2/SiO_2$ or $SnO_2/SiO_2/SnO_2$ stack.

6. Glazing according to claim 1, additionally including a carrier substrate and a primer/tie-layer coating for the electrically controllable system (a) with respect to the carrier substrate.

7. Glazing according to claim 6, wherein the carrier substrate comprises a polymeric/plastic material.

8. Glazing according to claim 1, which also includes a coating having hydrophilic/antimisting properties or having hydrophobic/anti-rain properties on at least one of its external faces.

9. Glazing according to claim 8, wherein the coating having hydrophobic properties includes at least one layer comprising a composition having at least one fluoroalkoxysilane, the alkoxy functional groups of which are directly linked to the silicon atom, a system of one or more aqueous solvents and at least one catalyst which is an acid and/or a Brönsted base.

10. Glazing according to claim 1, which also includes a coating having photocatalytic/antifouling properties.

11. Glazing according to claim 10, wherein the coating having photocatalytic/antifouling properties is located on at least one of its external faces.

12. Glazing according to claim 11, wherein the coating having photocatalytic/antifouling properties comprises $TiO_2$ at least partially crystallized in the anatase form.

13. Glazing according to claim 1, which also includes at least one coating having electromagnetic screening properties.

14. Glazing according to claim 1, wherein the electrically controllable system (a) is a superposition of functional layers placed between two carrier substrates, each of the said substrates independently being rigid, semi-rigid or flexible.

15. Glazing according to claim 14, wherein the electrically controllable system (a) includes, as carrier substrate, at least one rigid substrate of which the glazing is composed, and/or at least one flexible carrier substrate associated by lamination, with a rigid substrate of which the said glazing is composed.

16. Glazing according to claim 1, wherein the electrically controllable system (a) is a superposition of functional layers placed on a carrier substrate and provided with an inorganic or polymeric layer protective film.

17. Glazing according to claim 16, wherein the protective film is in the form of a lacquer or of a varnish.

18. Glazing comprising (a) at least one electrically controllable system having variable optical and/or energy properties, (b) at least one coating for adjusting the optical appearance conferred on the said glazing by the said system, said at least one coating having antireflection properties in the visible, wherein said coating having antireflection properties is deposited on at least one of the external faces of said glazing and comprises a stack of thin layers having alternately high and low reflective indices or a graded-refractive-index layer, and (c) at least one coating for attenuating/modifying the color of the glazing in reflection, wherein the coating (c) is interposed between the electrically controllable system (a) and a substrate for said glazing.

19. Glazing according to claim 1, wherein the electrically controllable system (a) is an all-solid electrochromic system.

20. Glazing according to claim 1, wherein electrically controllable system (a) is in the form of a system comprising one or more reversible-insertion materials of the electrochromic system or gasochromic system type, or in the form of an optical-valve or viologen-based system.

21. Glazing according to claim 1, wherein electrically controllable system (a) is in the form of a liquid-crystal or cholesteric-gel system.

* * * * *